Figure 6:
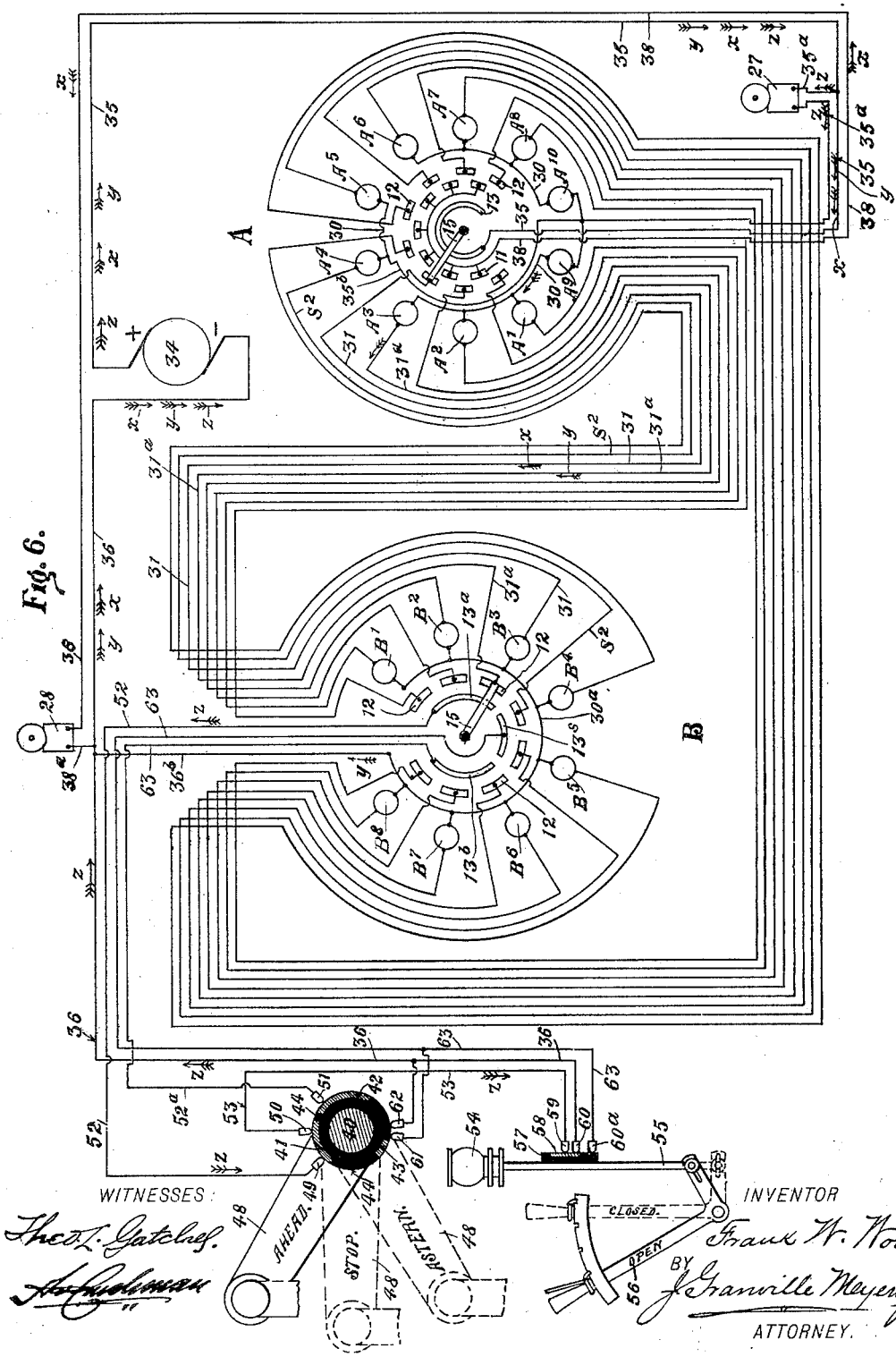

No. 667,859. Patented Feb. 12, 1901.
F. W. WOOD.
SHIP'S TELEGRAPH.
(Application filed July 11, 1900.)
(No Model.) 4 Sheets—Sheet 1.
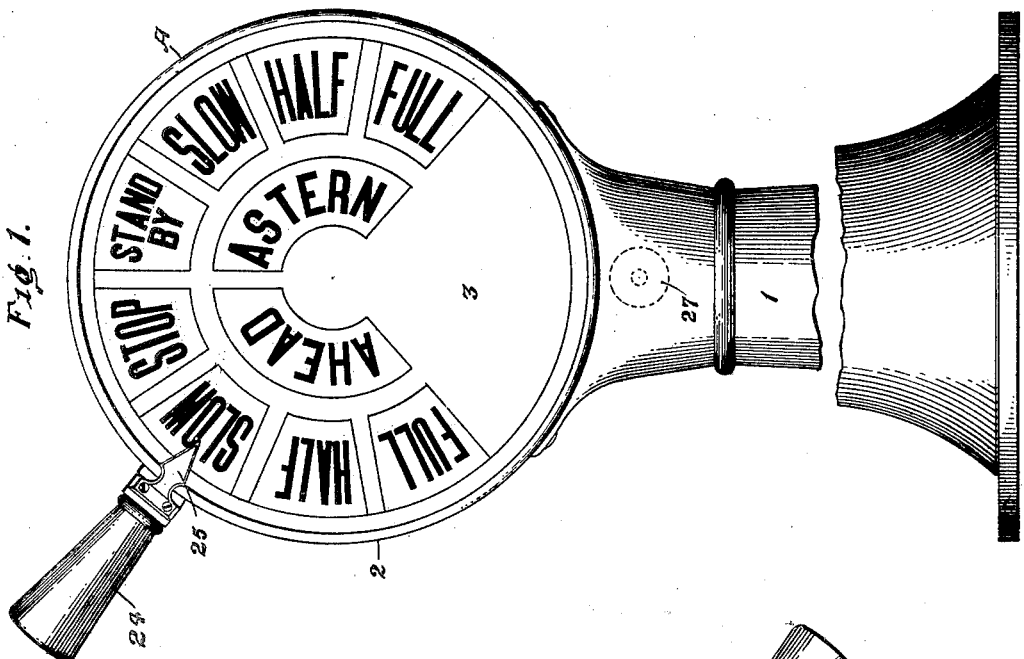
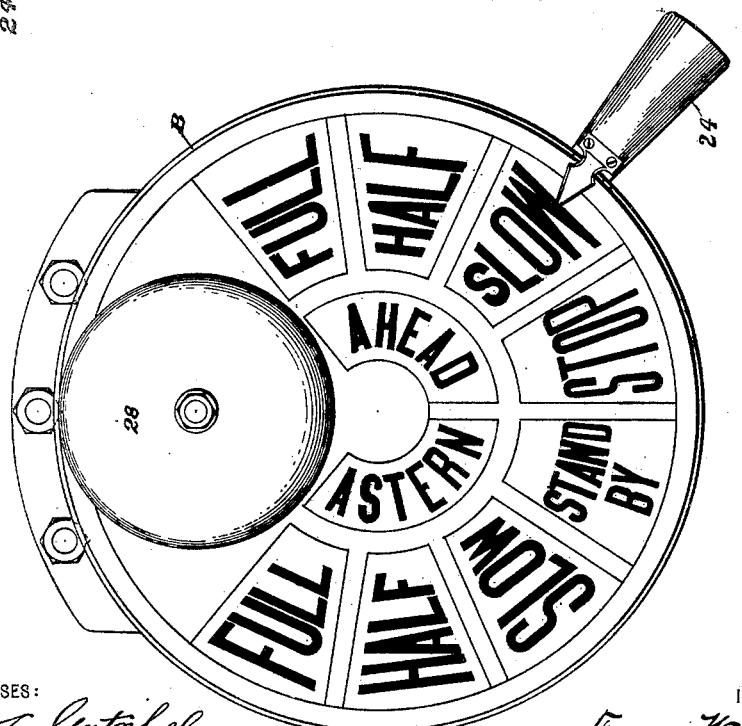

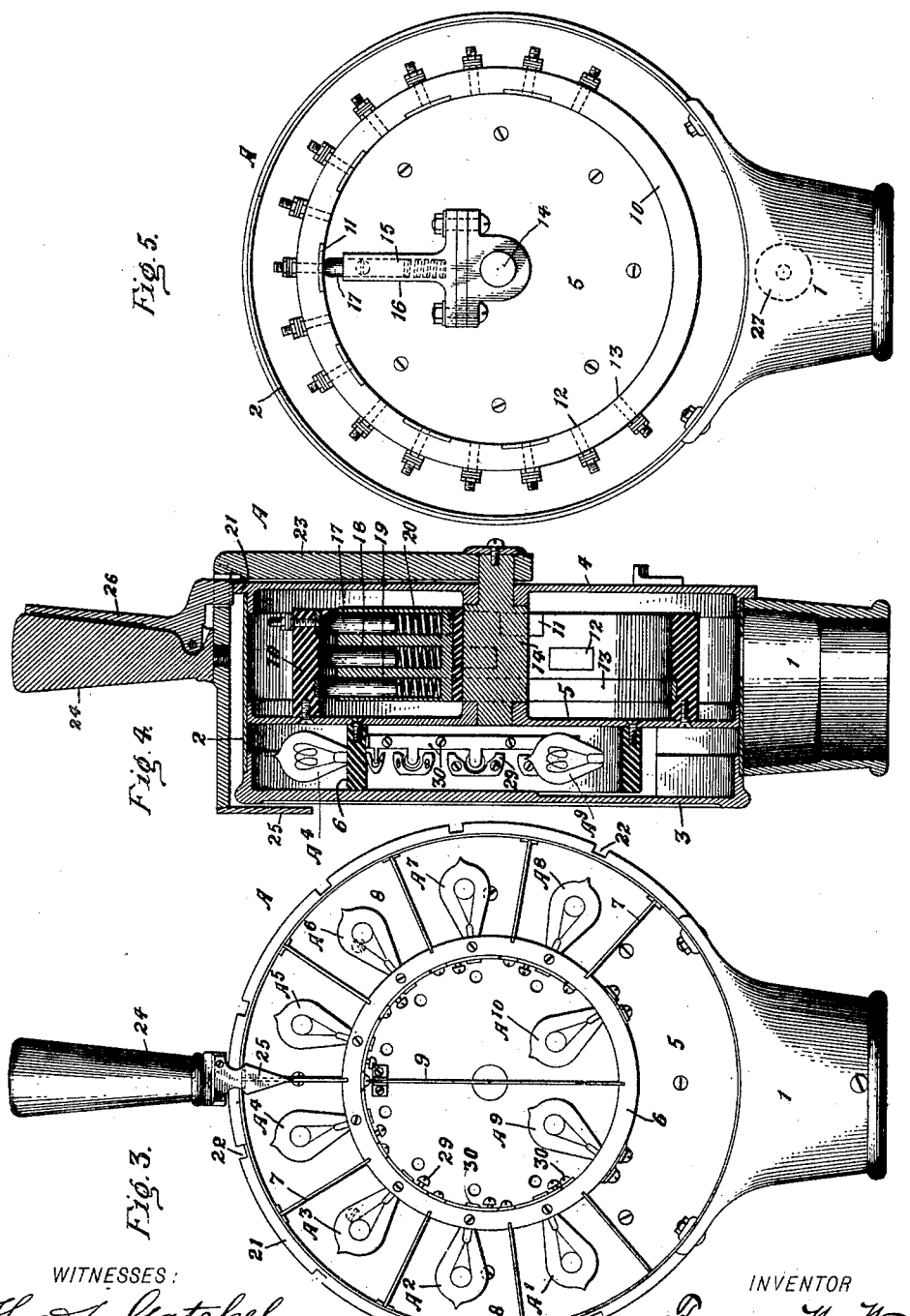

No. 667,859. Patented Feb. 12, 1901.
F. W. WOOD.
SHIP'S TELEGRAPH.
(Application filed July 11, 1900.)
(No Model.) 4 Sheets—Sheet 3.

WITNESSES
INVENTOR
Frank W. Wood
BY
J. Granville Meyers
ATTORNEY.

No. 667,859. Patented Feb. 12, 1901.
F. W. WOOD.
SHIP'S TELEGRAPH.
(Application filed July 11, 1900.)
(No Model.) 4 Sheets—Sheet 4.
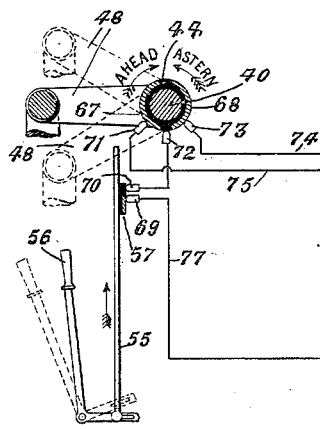
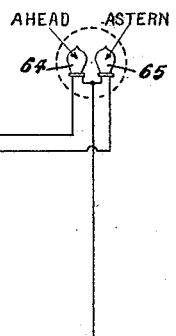
Fig. 7.
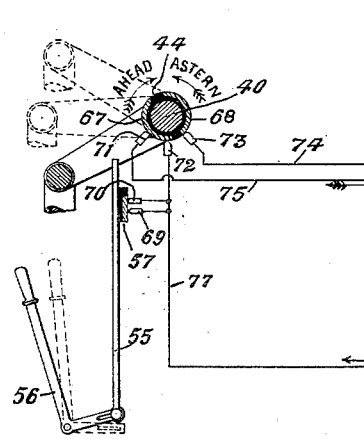
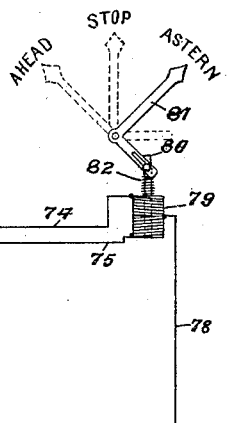
Fig. 8.
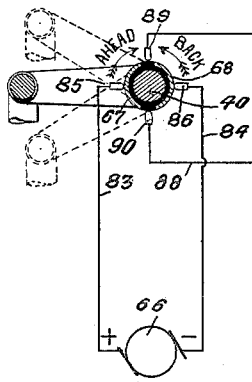
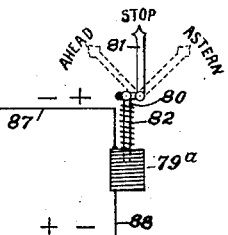
Fig. 9.
WITNESSES:
Theo. L. Gatchel.
A. W. Cushman.
INVENTOR
Frank W. Wood,
BY
J. Granville Meyers
ATTORNEY.
THE NORRIS PETERS CO., PHOTO-LITHO., WASHINGTON, D. C.

UNITED STATES PATENT OFFICE.

FRANK W. WOOD, OF NEWPORT NEWS, VIRGINIA.

SHIP'S TELEGRAPH.

SPECIFICATION forming part of Letters Patent No. 667,859, dated February 12, 1901.

Application filed July 11, 1900. Serial No. 23,208. (No model.)

*To all whom it may concern:*

Be it known that I, FRANK W. WOOD, a citizen of the United States, residing at Newport News, Warwick county, State of Virginia, have invented certain new and useful Improvements in Ships' Telegraphs, of which the following is a specification.

This invention relates to ships' telegraphs, and has for one object to provide an improved telegraph for use on shipboard by means of which orders may be telegraphed from one station to another, and after the order has been correctly executed the order may be repeated at the sending-station to indicate that the order has been properly carried into effect.

It has for its further object to so construct and arrange the signaling apparatus that the order cannot be repeated at the sending-station until after it has been correctly executed and to render it impossible to signal the sending-station if the order be improperly executed.

It also has for its object to provide a ship's telegraph of the character described wherein after the order has been received and the operator sets his indicator properly to repeat the order at the sending-station said order will be automatically repeated by the act of properly executing the same.

To these ends my invention consists in the features and in the construction, arrangement, and combination of parts hereinafter described, and particularly pointed out in the claims following the description, reference being had to the accompanying drawings, forming a part of this specification.

The invention is principally designed for transmitting orders from the bridge, pilothouse, or conning-tower or from all three stations or several stations or any other stations on board ship to the engine-room and for repeating the orders from the engine-room back to the bridge or other station to indicate that the order has been properly executed. For the purpose of brevity and clearness of explanation I herein term the instrument located on the bridge or similar station for sending the order to the engine-room the "transmitter" and the instrument in the engine-room for receiving the order and repeating it back to the bridge the "receiver," though both the transmitter and the receiver are constructed substantially alike and both receive and transmit the signals or orders.

In the drawings, wherein like characters of reference indicate corresponding parts in the several views, Figure 1 is a view in elevation of the transmitter arranged on the ship's bridge or other desired location. Fig. 2 is a similar view of the receiver arranged in the engine-room. Fig. 3 is a similar view of the transmitter with the front or dial removed. Fig. 4 is a transverse vertical central sectional view thereof. Fig. 5 is a rear view of the transmitter with the back of the casing removed. Fig. 6 is a diagrammatic view illustrating the circuits. Figs. 7, 8, and 9 are diagrammatic views illustrating slight modifications of my invention.

Referring to the drawings, the letter A indicates the transmitter, and B the receiver. Inasmuch as both the transmitter and the receiver are constructed substantially alike, a description of the construction of one will serve for both.

Referring to Figs. 1, 3, 4, and 5 of the drawings, wherein is illustrated the transmitter, the numeral 1 indicates a pedestal on which is rigidly mounted a cylindrical casing 2, closed in front by a transparent or translucent dial 3 and at its rear by a head or cover 4. Arranged intermediate the front and rear of the cylindrical casing is a diaphragm 5, to the front of which is fixed a hard-rubber ring 6, and extending from said ring to the periphery of the cylindrical casing are radial partitions 7, which form a number of compartments 8, in each of which is disposed an incandescent electric lamp. The lamps are mounted on the rubber ring 6, and are shown in the present instance as being eight in number, and are respectively indicated by the characters $A'$ to $A^8$. The space inclosed within the rubber ring 6 is divided into two compartments by a vertical partition 9, and in said compartments are respectively arranged electric lamps $A^9$ and $A^{10}$. On the face of the dial over the respective compartments 8 are delineated in opaque or colored letters the desired orders usually transmitted to the engineer's room, and on the dial over the two compartments containing the lamps $A^9$ and $A^{10}$ are delineated the orders "Ahead" and "Astern." The lamps $A^9$ and $A^{10}$ indicate to the officer in charge in which direction the engine is running, said lamps being connected up to the wire leading to the reversing-shaft, as will hereinafter appear, $A^9$ from the "ahead" side and $A^{10}$ from the "astern" side, and for this reason are not required in the receiver, from which they are therefore omitted. By means of this arrangement it will be evident that the lamps will only illuminate or render visible those orders actually transmitted or received for the time being, all the other orders remaining inconspicuous or invisible until the lamps in the compartments behind the same are brought into action.

On the rear of the diaphragm 5 is fixed a hard-rubber ring 10, to the inner circumference of which are fixed the three annular series of terminal contacts 11, 12, and 13, the numeral 11 indicating the contacts for the bell-circuit, 12 the contacts for the lamp-circuit, and 13 the common return-wire terminal contact extending entirely around the rubber ring 10 and forming a return-wire terminal contact for both the lamp and the bell circuits. In the receiver this contact 13 is divided into three sections, one, $13^a$, being the "ahead," one, $13^s$, the "stop," and the other, $13^b$, the "astern" section, its purpose being shown later.

Journaled in the head or cover 4 and in the diaphragm 5 is a spindle 14, on which is fixed a contact-maker 15, comprising a metal arm 16, provided with three longitudinal sockets, in which are respectively arranged carbon pencils 17, 18, and 19. Disposed in the sockets at the inner ends of the carbon pencils are coiled springs 20, which operate to force the carbon pencils outward into engagement with the rubber ring 10 or the contacts 11, 12, and 13. The head or cover 4 is provided with an annular flange 21, in which is formed a plurality of notches or slots 22, one such notch being formed opposite each of the compartments 8, in which are arranged the lamps $A'$ to $A^8$, inclusive. On the projecting rear end of the spindle 14 is fixed an arm 23, provided with a handle 24 and carrying a pointer or index-hand 25, that is arranged to travel over the dial when the spindle is turned by the arm 23 and indicate thereon the proper position to turn the spindle in order to transmit any desired order. On the handle 24 is arranged a pivoted spring latch or dog 26, of well-known construction, that operates to engage the notches 22 and hold the arm 23 in either of the adjusted positions to which it may be turned.

An electric bell 27 is arranged in the pedestal 1, and a corresponding bell 28 is arranged on the receiver B.

The numeral 29 indicates the section-wire terminals of the lamp-sockets, and the numeral 30 a common terminal for a series of lamps on either side of the transmitter bearing the signal "Ahead," "Stop," or "Astern," and the numeral $30^a$ indicates a corresponding common terminal for all the lamps in the receiver B in the engine-room.

As shown most clearly in Fig. 4 of the drawings, the bell-circuit contacts 11 alternate with the lamp-circuit contacts 12, whereby when the arm 23 is moved to change from one order to another the carbon pencil 17 momentarily makes contact with one of the contacts 11, thus closing the bell-circuit and ringing the bell 28 in the engine-room, as will be more fully hereinafter explained, and giving audible warning to the engineer that the order has been changed or a new order has been given. In the same manner when the engineer repeats the order to the bridge by correctly executing it, as will be hereinafter set forth, the bell 27 on the bridge-transmitter will be rung and indicate to the officer giving the order the promptitude with which the same has been executed.

Each lamp $A'$ to $A^{10}$ in the transmitter is connected by a separate wire $31^a$ to one of the contacts 12 in the receiver, and each lamp $B'$ to $B^8$ in the receiver is in like manner connected by a separate wire 31 to the contacts 12 in the transmitter, the other or return terminals in each series of lamps being connected to a common contact 13 by the contact-maker 15.

The numeral 34 indicates a dynamo or other suitable generator or source of electrical energy, one wire 35 from which is connected to the common lamp-terminal 13 of the transmitter, and the other wire 36 leads to the throttle-valve lever in the engine-room, as will be hereinafter explained. A branch wire $35^a$ leads from the wire 35 to the common lamp-terminal 30 in the transmitter and includes the bell 27, which is a single-stroke bell of ordinary construction, for the purpose hereinafter made apparent. The common terminal $30^a$ of the lamps in the receivers is connected by a wire $36^b$ to the wire 36, leading to the dynamo. Branched to the wire 36 by a wire $38^a$ is one pole of the bell 28, which is an ordinary vibrator, the other pole of the bell being connected to wire 38, which leads to the contacts 11 in the transmitter. The bell-circuit from A to B through the bell 28 is an individual circuit independent of all the lamps.

Let it be assumed that the officer on the bridge wishes to signal to the engineer "Ahead slow." Then he turns the arm 23, carrying the index or pointer to the position shown in Figs. 1 and 6 on the transmitter. In doing this the carbon pencil 17 contacts with one of the contacts 11 of the transmitter and for a brief instant closes the bell-circuit through the bell 28 in the engine-room in the following manner: Starting from the dynamo, the current follows the direction of the arrows marked $x$—that is to say, it passes over wire 35 to the common terminal 13 in the transmitter, to one of the bell-contacts 11, thence over wire 38 to the bell 28, thence over branch wire $38^a$, and back to the dynamo over the wire 36, ringing the bell in the engine-room and warning the engineer that the order is being changed or a new order being signaled to him. The bell-circuit remains closed but the fraction of a second, however, and is broken at the contacts 11 as the arm 23 is moved around to bring the carbon 18 into engagement with the proper contact 12 in the lamp-circuit, as shown on the transmitter in Fig. 6. The circuit will then be completed from the transmitter through the lamp $B^3$ in the receiver as follows: Starting from the dynamo and following the arrows marked $y$, it will be seen that the current passes over the wire 35 and to the terminal 13 in the transmitter, as before, then continues through the contact-maker 15 to the proper terminal or contact 12, thence over the corresponding section-wire 31 through the lamp $B^3$ in the receiver, thence to the common lamp-terminal $30^a$, thence by wires $36^b$ and 36 back to the dynamo. The lamp $B^3$ is thus lighted and being behind the signal-order "Slow" and on the "ahead" side of the receiver the engineer is instantly informed that the order is to "Go ahead slow." The engineer having received the order, before executing it he sets the receiver so that the order will be automatically repeated on the transmitter, as soon as correctly carried out, in the following manner: Referring to Fig. 6 of the drawings, the numeral 40 indicates the reversing-shaft of the engine, on which is fixed a sleeve consisting of three metallic or other conducting-segments 41, 42, and 43, separated from one another and from the reversing-shaft by a sleeve 44, of insulating or non-conducting material. On the reversing-shaft is fixed the usual reversing-lever 48. Arranged in frictional engagement with the sleeve are three contacts 49, 50, and 51, respectively forming the terminals of the wire 52, leading from the common contact $13^a$ of the receiver, a wire 53, leading to the throttle-valve, and the wire $52^a$, leading to the common contact $13^b$ in the receiver. The numeral 54 indicates the throttle-valve, 55 the valve-stem, and 56 the usual throttle-valve lever. On the valve-stem 55 is fixed a circuit maker and breaker, consisting of a block 57, of insulating material, carrying a metallic plate 58. Arranged in frictional engagement with the circuit maker and breaker are three contacts 59, 60, and $60^a$, respectively forming the terminals of the wires 53, 36, and 63. It will be evident that as the valve-stem 55 is moved downward to open the throttle-valve the contacts 59 and 60 will both be brought into engagement with the metallic plate 58 and the circuit will be closed at this point, and also that when the valve-stem is raised to close the throttle-valve the contacts will engage the insulated block 57 and the circuit will be broken. Let it be assumed that the order has been transmitted to the engine-room, as before described. Then before executing the order the engineer prepares to repeat it by setting the index-hand over the compartment of the receiver containing the lamp $B^3$, which is now lighted. He then obeys or carries the order into effect by moving the reversing-lever into the position shown by full lines in Fig. 6 and marked "Ahead" and by operating the throttle-valve lever to open the throttle-valve, as shown in said figure of drawings. The instant this has been accomplished the bell and lamp circuits in the transmitter will be completed and the bell sounded and the proper lamps $A^9$ and $A^3$ lighted in the transmitter in the following manner: Starting from the dynamo, the current traverses the wire 35, and following the direction indicated by the arrows marked $z$ passes through the bell 27, sounding the latter, and thence by wire $35^a$ passes to the common lamp-terminal 30 of the transmitter, then through the lamps $A^9$ and $A^3$ and by the wire $31^a$ to one of the lamp-contacts 12 of the receiver, thence by the contact-maker 15 to the common contact $13^a$. From the latter the current passes by the wire 52 to contact 49, through the segment 41 to the contact 50, thence by wire 53 to contact 59, through the metallic plate 58 to contact 60, thence by wire 36 back to the dynamo, thereby completing the circuit, ringing the bell 27 on the bridge and lighting the lamps $A^9$ and $A^3$ behind the signals "Ahead" and "Slow" in the transmitter. The officer on the bridge is thus notified that the order sent by him has been received and correctly understood and promptly and properly obeyed and executed. It will be manifest that it will be impossible for the engineer to reply to an order unless he properly puts said order into effect, as no circuit can be completed unless the mechanism starting the engine is in a corresponding position to the index-pointer on the receiver. As before stated, the bell 27 is of the single-stroke type and is of low resistance, thus striking but a single time when the order is repeated to the bridge and allowing the current to pass uninterruptedly through it the entire time the signal-lamps are lighted in the transmitter. In similar manner any of the desired orders may be transmitted from the bridge to the engine-room and repeated back from the latter, after the order has been properly executed, to the bridge.

Should the order "Stop" be given, the engineer will first place the index-pointer over the order "Stop" on the receiver, and in order to put this order into effect he must do one of the following things, viz: Either bring the reversing-lever to a neutral position, as shown in the dotted position marked "Stop" on the reversing-lever in Fig. 6, or else shut off the steam at the throttle-valve, or by manipulating both the reversing-shaft and throttle-valve, as set forth, as is sometimes done. It will be evident that if the former method of stopping the engine is adopted the metal segment 43 on the reversing-shaft will connect the contacts 61 and 62, thus connecting the common contact or terminal $13^s$ in the receiver with the dynamo-wire 36 over the wire 63. Should the engine be stopped by closing the throttle-valve, connection between the same two wires will be established through contact 60, metal plate 58 on the throttle-valve stem, and contact 60ª. Thus should the order "Stop" be signaled to the engineer and the reply index-pointer be placed at "Stop" over the lamp B⁴ on the receiver, the path of the current in the reply-circuit would be as follows: Starting from the dynamo, the current would pass over the wire 35 to the bell 27 in the transmitter, thence over the wire 35ª through the branch wire 35ᵇ to the lamp A⁴ in the transmitter, thence through section-wire S² to the section-contact 12 in the receiver, (opposite the order "Stop,") thence through the contact-maker 15 to the contact-section 13ˢ in the receiver, thence over wire 63 to contact 61 through metal plate 43 on the reversing-shaft to contact 62, thence over wire 36 back to the dynamo. It will thus be seen that in order to complete the circuits through the signal-orders "Stop" and "Stand by," either the reversing-shaft or the throttle-valve must be in a position which will stop the engine, and the circuits for repeating these two signal-orders can only be completed when either one or both of these two movements are executed. Hence the order "Stop" cannot be repeated when the engine is running, as both sets of contacts 59 60 and 61 62 would be open or bearing on the insulations 44 and 57.

In Figs. 7, 8, and 9 I have illustrated modified means of very simple constructions by means of which one of the principal objects of my invention may be carried into effect—viz., to infallibly indicate on the bridge or other station on board ship in which direction the engine is running or whether it be running or stopped. In the arrangement shown in Fig. 7 two lamps are employed to indicate whether the engine be running ahead or astern and when neither of said lamps is in circuit to indicate that the engine is stopped, while in the arrangement shown in Figs. 8 and 9 an index-hand controlled by a solenoid is employed for the same purpose.

Referring to Fig. 7, the numerals 64 and 65 designate two lamps that respectively indicate "Ahead" and "Astern;" 66, the dynamo; 55, the stem of the throttle-valve; 57, the contact-block carried thereby; 40, the reversing-shaft; 44, the insulated sleeve on said shaft; 67 and 68, two metal contact-segments on the sleeve insulated from each other and from the shaft by the sleeve 44; 69 and 70, two contacts engaging the contact-block on the throttle-valve stem, and 71, 72, and 73 three contacts arranged to engage the insulated sleeve or the contact-segments on the reversing-shaft. A wire 74 connects the contact 73 with the "Ahead" lamp, a wire 75 connects the contact 71 with the "Astern" lamp, a wire 76 leads from the contact 72 to the contact 70, and a wire 77 leads from the contact 69 to the dynamo, while a wire 78 leads from the dynamo and is branched to both of the lamps. The numeral 48 indicates the lever of the reversing-shaft. The operation of this arrangement of parts is as follows: Let it be assumed that the engine is stopped. Then the parts will be in the position shown in Fig. 7, and the circuit will be broken or incomplete through both lamps, as the contacts 71 and 73, forming the terminals of the two lamp-circuits, will be both electrically disconnected from the contact 72, which forms the terminal of the dynamo-circuit, as the contact is then resting on the insulation 44. If the reversing-shaft be turned in the direction of the arrow marked "Ahead," however, the two contacts 72 and 73 will then engage the contact-segment 68, and when the throttle-valve is opened to start the engine the path of the current will be as follows: Starting from the dynamo the current passes over wire 77, through contacts 69 and 70 and contact-block 57 over wire 76 to contact 72, through contact 68 to contact 73, thence over wire 74 to lamp 64, and over wire 78 back to the dynamo, thus lighting the lamp 64 and indicating that the engine is running ahead. If the reversing-shaft be turned in the direction indicated by the arrow marked "Astern," then the contacts 72 and 71 will be thrown into engagement with the contact-segment 67, and the current will then pass from the dynamo to contact 72, as before, thence through segment 67 and contact 71 to and over the wire 75, through the lamp 65, and back to the dynamo by wire 78, thus lighting the lamp 65 and indicating that the engine is running astern.

In Fig. 8 I have shown precisely the same arrangement as is shown in Fig. 7, excepting that instead of the two lamps 64 and 65 a pivoted indexed hand and solenoid are employed. Referring to said figure, the numeral 79 indicates a solenoid, 80 the core or armature thereof, and 81 the indexed hand, consisting of a bell-crank lever pivoted at its elbow or angle and provided with a pointer at one end and at its other end loosely pivoted to the end of the solenoid-core or armature. A coil-spring 82 is disposed about the core or armature and operates to normally hold the core or armature and the indexed hand in a neutral position. The wires 74 and 75 are wound about the solenoid in opposite directions, and hence when the current is passed through the solenoid over the wires 74 and 78 in the manner described in connection with Fig. 7 the core or armature 80 will be expelled or forced upward, thus throwing the indexed hand over to the indication "Ahead" and, conversely, when the current is passed through the solenoid over the wires 75 and 78 the core or armature will be attracted within the solenoid or drawn downward, thus throwing the index-hand over to the indication "Astern." When both circuits are incomplete through the solenoid, the coiled spring will move the index-hand to a point midway between the indications "Ahead" and "Astern," and give notice that the engine has stopped.

In Fig. 9 the throttle-valve forms no part of the signaling system, the index-hand being controlled entirely by the reversing-shaft. Similar reference-numerals in said figure indicate corresponding parts in Figs. 7 and 8. Referring to Fig. 9, 66 indicates the dynamo, 40 the reversing-shaft, 79ª the solenoid, and 81 the index-hand. Wires 83 and 84 respectively lead from the dynamos to contacts 85 and 86, arranged to engage the contact-segments 67 and 68 on opposite sides of the reversing-shaft, and wires 87 and 88 lead, respectively, from two contacts 89 and 90, arranged to engage the reversing-shaft and each disposed ninety degrees from both the contacts 67 and 68. The solenoid is continuously wound in one direction only. If the reversing-shaft be turned in the direction indicated by the arrow marked "Ahead," then the path of the current will pass from the dynamo by wire 83 through contacts 85, 67, and 89 over wire 87 through the solenoid, thence by wire 88 through contacts 90, 68, and 86 back to the dynamo by wire 84, thus attracting the core or armature 80 and throwing the index-hand over to the indication "Ahead," or if the reversing-lever be turned in the direction indicated by the arrow marked "Back" the current will pass by the wire 83 through the contacts 85, 67, and 90 over the wire 88 through the solenoid 79ª, thence by wire 87 and contacts 89, 68, and 86 back over the wire 84 to the dynamo. The direction of the current through the solenoid will thus be reversed, and hence the core or armature will be withheld or forced upward, thereby throwing the index-hand over to the indication "Astern." If the engine be stopped, the parts will then be in the position indicated in Fig. 9, and hence the circuit will be broken. The coil-spring 82 will then move the index-hand over the indication "Stop."

Having thus described my invention, what I claim is—

1. In a ship's telegraph, the combination with a signal-transmitting and a signal-receiving instrument, and the reversing-shaft of the engine of means for transmitting signal-orders from the transmitter to the receiver, and means automatically operated by the movement of the reversing-shaft for repeating the signal-order on the transmitter, substantially as described.

2. In a ship's telegraph, the combination with a signal-transmitting and a signal-receiving instrument, and the throttle-valve of the engine, of means for transmitting signal-orders from the transmitter to the receiver, and means automatically operated by the movement of the throttle-valve for repeating the signal-order on the transmitter, substantially as described.

3. In a ship's telegraph, the combination with a signal-transmitting and a signal-receiving instrument, and the reversing-shaft and throttle-valve of the engine, of means for transmitting signal-orders from the transmitter to the receiver, and means automatically operated by the combined movements of the reversing-shaft and throttle-valve for repeating the signal-order to the transmitter, substantially as described.

4. In a ship's telegraph, the combination with a signal-transmitting and a signal-receiving instrument, and the engine-controlling mechanism, of means for transmitting signal-orders from the transmitter to the receiver, means for setting the receiver to repeat the signal-order to the transmitter, and means automatically operated by the movement of the engine-controlling mechanism for repeating the signal-order to the transmitter when the signal is correctly executed, substantially as described.

5. In a ship's telegraph, the combination with a signal-transmitting instrument and a signal-receiving instrument, and the engine-controlling mechanism, of two corresponding series of electric indicators respectively arranged in the transmitter and receiver, electric circuits connecting the transmitter with the indications in the receiver, electric circuits connecting the receiver with the indicators in the transmitter, means for closing at the transmitter either of the receiver indicator-circuits at will to transmit the signal-orders to the receiver, means for partially closing at the receiver either of the transmitter indicator-circuits at will, and means automatically operated by the movement of the engine-controlling mechanism for completing said circuits and repeating the signal-order to the transmitter when the signal-order has been correctly executed, substantially as described.

6. In a ship's telegraph, the combination with a signal-transmitting and a signal-receiving instrument, and the engine-controlling mechanism, of means for transmitting signal-orders from the transmitter to the receiver, means for setting the receiver to repeat the signal-order to the transmitter, means automatically operated by the movement of the engine-controlling mechanism for repeating the signal-order to the transmitter when the signal-order is correctly executed, audible signals arranged respectively at the transmitter and receiver, and mechanism actuated by either the signal transmitting or repeating mechanism for sounding the audible signal at the receiver or transmitter, substantially as described.

7. In a ship's telegraph, the combination with a signal-transmitting and a signal-receiving instrument provided with corresponding electric indicators, and each provided with a signal-transmitting device, independent conductors leading from a series of contacts in the transmitter to the several indicators of the receiver, independent conductors leading from a series of contacts in the receiver to the several indicators of the transmitter and common return-conductors connecting said transmitting and receiving instruments and including an electric generator, the arrangement being such that the signal-transmitting device of either instrument can be moved to engage either of the adjacent contacts and connect the same with the corresponding indicator of the other instrument, and means automatically operated by the movement of the engine-controlling mechanism for completing the circuits and repeating the signal-order to the transmitter when the signal-order has been correctly executed, substantially as described.

8. In a ship's telegraph, the combination with a signal-transmitting and a signal-receiving instrument provided with corresponding electric indicators and each provided with a series of contacts corresponding to the indications of the other, separate conductors leading from the contacts of one instrument, a circuit-closer for each instrument, a common terminal connecting all the indicators in each instrument, and a common return-conductor connecting the common terminal in each instrument with the circuit-closer in the other instrument and including an electric generator and an auxiliary circuit-closing mechanism for completing the circuit from the receiver to the transmitter, whereby the circuit can be completed through the circuit-closer and any one of the contacts of either one of the instruments and through the corresponding indicator of the other instrument, substantially as described.

9. In a ship's telegraph, the combination with a signal-transmitting and a signal-receiving instrument provided with corresponding electric indicators and each provided with a signal-transmitting device, independent conductors leading from a series of contacts in the transmitter to the several indicators of the receiver, independent conductors leading from a series of contacts in the receiver to the several indicators of the transmitter, common return-conductors connecting said transmitting and receiving instruments and including an electric generator, the arrangement being such that the signal-transmitting device of either instrument can be moved to engage either of the adjacent contacts and complete the circuit through the corresponding indicator of the other instrument, and a bell arranged on both the transmitting and receiving instruments, and means for throwing the bell of either instrument into circuit whenever a signal is transmitted from the other instrument, substantially as described.

10. In a ship's telegraph, the combination with a signal-transmitting and a signal-receiving instrument provided with corresponding electric indicators and each provided with a signal-transmitting device, independent conductors leading from a series of contacts in the transmitter to the several indicators of the receiver, independent conductors leading from a series of contacts in the receiver to the several indicators of the transmitter, common return-conductors connecting said transmitting and receiving instruments, and including an electric generator, the arrangement being such that the signal-transmitting device of either instrument can be moved to engage either of the adjacent contacts, and complete the circuit through the corresponding indicator of the other instrument, and a bell arranged on both the transmitting and receiving instruments, the bell on the receiver being arranged in an independent and separate circuit, and the bell on the transmitter being arranged in series with the transmitter-indicators, substantially as described.

11. In a ship's telegraph, the combination with the reversing-shaft of the engine provided with a plurality of independent insulated contact-segments, of a signaling device adapted to indicate the direction in which the engine is running, an electric generator, circuits connecting the signaling device and the generator and provided with terminal contacts arranged to engage the contact-segments in the reversing-shaft when the latter is moved in either direction, and complete the circuit and indicate whether the engine is running ahead or astern, substantially as described.

12. In a ship's telegraph, the combination with the reversing-shaft of the engine provided with a plurality of independent insulated contact-segments, of a signaling device adapted to indicate the direction in which the engine is running and when the engine is idle, an electric generator, circuits connecting the signaling device and the generator and provided with terminal contacts arranged to engage the contact-segments on the reversing-shaft when the latter is shifted and complete the circuit and indicate whether the engine is running ahead or astern or is in a state of rest, substantially as described.

13. In a ship's telegraph, the combination with the reversing-shaft, of a signaling device for indicating in which direction the engine is running, an electric generator, two segmental contacts mounted on the reversing-shaft and insulated therefrom and from each other, three terminal contacts arranged to engage the segmental contacts, separate conductors, respectively leading from two of the terminal contacts to the signaling device, and a conductor leading from the third contact to the signaling device and including the generator, only two of the terminal contacts being adapted to engage either of the segmental contacts at a time, whereby either of the signaling-device circuits will be completed when the reversing-valve is shifted to indicate in which direction the engine is running, substantially as described.

14. In a ship's telegraph, a signal-transmitting and a signal-receiving instrument each comprising a plurality of electrically-actuated indicators, a bell, two annularly-arranged series of contacts, the contacts of each series being insulated from one another, independent conductors leading from the contacts of one of said series of one of the instruments to the indicators of the other instrument, an independent conductor leading from the contact of the other series of contacts to the bell, an annular contact, return-conductors leading from the several indicators to the common annular contact, a conductor leading from the bell to said common annular contact and a suitable contact-maker carrying three contacts and adapted to engage the annularly-arranged contacts and complete the circuits through the bell and either of the indicators, substantially as described.

15. In a ship's telegraph, a signal-transmitting apparatus comprising a plurality of lamps arranged in separate circuits, a plurality of annularly-arranged contacts insulated from one another and each connected by a separate conductor with one of the lamps, an annular contact arranged parallel to the annular series of contacts and connected with the common terminal of the lamps, and a rotatable contact-maker arranged to simultaneously contact with the annular contact and with either of the annular series of contacts, whereby either of said lamps may be thrown into circuit at will, substantially as described.

16. In a ship's telegraph, the combination of a signal-transmitting and a signal-receiving instrument each comprising a circular casing divided into a plurality of separate compartments by radial partitions and covered by a dial bearing separate indicating characters disposed over the several compartments, a lamp arranged in each compartment, said lamps being arranged in separate circuits, an annular contact connected with the common terminal of all the lamps, a plurality of annularly-arranged contacts disposed parallel to the annular contact and each connected by a separate conductor with one of the lamps, and a rotatable contact-maker arranged to be caused to contact with the annular contact and either of the contacts of the annular series, at will, whereby the circuit may be completed through either one of the lamps to display the corresponding indicating character on the dial, substantially as described.

17. In a ship's telegraph, the combination of a circular casing divided into a plurality of separate compartments by radial partitions and covered by a dial bearing separate indicating characters disposed over the several compartments, a lamp arranged in each compartment, said lamps being arranged in separate circuits, an annular contact connected with the common terminal of all the lamps, a plurality of annularly-arranged contacts disposed parallel to the annular contact and each connected by a separate conductor with one of the lamps, a rotatable contact-maker arranged to simultaneously contact with the annular contact and either of the annular series of contacts, a dial bearing a plurality of indicating characters corresponding to those on the first-named dial, and an index-hand carried by the contact-maker and adapted to be moved over either of the indicating characters on the last-named dial to complete the circuit through either of the desired lamps, substantially as described and for the purpose specified.

18. In a ship's telegraph, the combination with a plurality of lamps arranged in separate circuits, of a circular casing provided with a ring of insulating material, an annular contact fixed on the inner side of said ring and connected with the common terminal of all the lamps, a plurality of separate contacts arranged in an annular series on the inner side of said ring, a contact-maker comprising a rotatable spindle journaled centrally of the ring and provided with a radial arm insulated from the spindle and having radial sockets, carbon pencils loosely arranged in said sockets, coiled springs disposed in the sockets behind the pencils and operating to force the pencils radially outward into engagement with the annular contact and separate contacts, and means for rotating the spindle to cause the pencils to make contact with the annular contact and either of the separate contacts at will and thereby complete the circuit through either of the lamps, substantially as described.

19. In a ship's telegraph, the combination with a plurality of lamps arranged in separate circuits, of a circular casing provided with a ring of insulating material, an annular contact fixed on the inner side of said ring and connected with the common terminal of all the lamps, a plurality of separate contacts arranged in an annular series on the inner side of the ring, a dial on said casing bearing a plurality of indicating characters corresponding to the several lamps, a rotatable contact-maker adapted to simultaneously engage the annular contact and either of the separate contacts, an index-pointer carried by the rotatable contact-maker and arranged to register with either of the indicating characters on the dial, and means for rotating the contact-maker, substantially as described and for the purpose specified.

20. In a ship's telegraph, the combination with a plurality of lamps arranged in separate circuits, of a circular casing provided with a ring of insulating material, an annular contact fixed on the inner side of said ring and connected with the common terminal of all the lamps, a plurality of separate contacts arranged in an annular series on the inner side of the ring, a dial on said casing bearing a plurality of indicating characters corresponding to the several lamps, a rotatable contact-maker adapted to simultaneously engage the annular contact and either of the separate contacts, an index-pointer carried by the rotatable contact-maker and arranged to register with either of the indicating characters on the dial, a handle fixed on the axis of the contact-maker and provided with a pivoted spring-catch adapted to engage either of a series of notches formed on the periphery of the casing opposite the several indicating characters, substantially as described and for the purpose specified.

In testimony whereof I have hereunto set my hand in presence of two subscribing witnesses.

FRANK W. WOOD.

Witnesses:
THEO. L. GATCHEL,
J. E. WARREN.